May 20, 1958  A. J. SOLARI  2,835,515
ROTARY MECHANICAL SEAL WITH SELF-LOCKING SEAT
Filed Dec. 5, 1955  2 Sheets-Sheet 1

INVENTOR:
ARCHIE J. SOLARI
BY
Edward R. Sowrdes
ATTY.

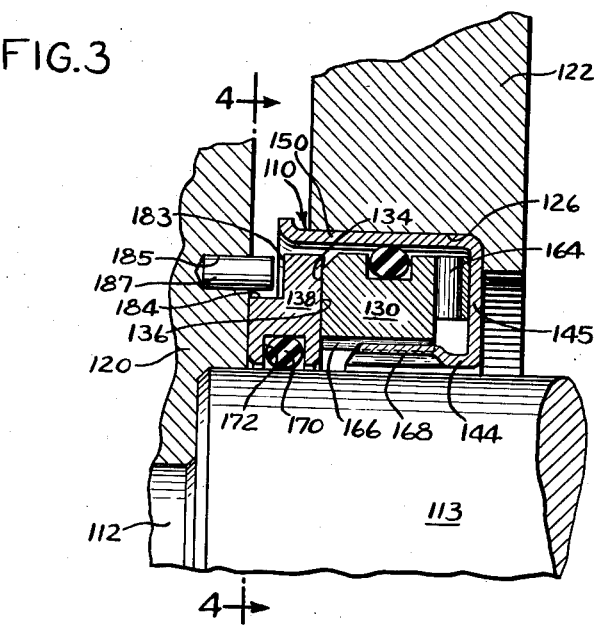
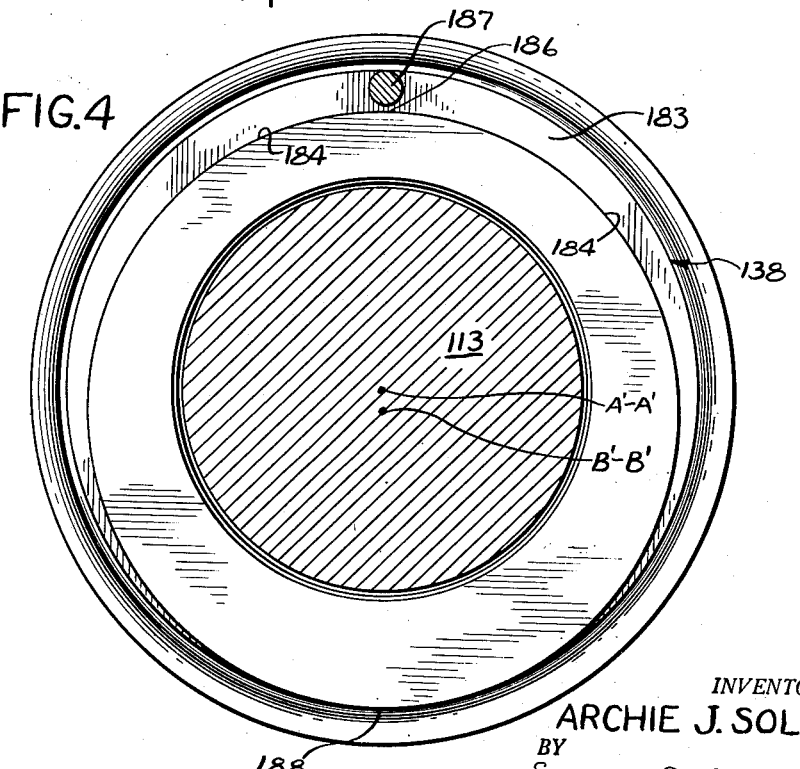

United States Patent Office 2,835,515
Patented May 20, 1958

2,835,515

ROTARY MECHANICAL SEAL WITH SELF-LOCKING SEAT

Archie J. Solari, Chicago, Ill., assignor to Crane Packing Company, Chicago, Ill., a corporation of Illinois Application December 5, 1955, Serial No. 551,057

2 Claims. (Cl. 286—11.15)

The present invention relates to rotary mechanical seals for effecting a seal between relatively rotatable machine elements, the seal utilizing radially disposed cooperating running sealing surfaces to effect the sealing action. More particularly, the invention relates to a rotary mechanical seal of this general character in which the part which provides one of the radially disposed running sealing surfaces has associated therewith locking means whereby the part, when operatively installed on or in one of the relatively moving elements undergoing sealing, may be held against rotation relative thereto so that if this element be stationary, the part will be held against rotation, and if the member be rotatable, the part will be caused to rotate in unison therewith.

Rotary mechanical seals of the type outlined above include, among other parts, a hard sealing washer having a low coefficient of friction and provided with a face thereon which is lapped so as to be substantially optically flat. This washer is designed for cooperation with a similar substantially optical flat surface provided on a seal seat. In certain installations it is necessary that the seat, and sometimes the washer, which is in the form of an annular ring-like member, be pressed onto or into one of the relatively rotating elements, utilizing a preloading sleeve of elastomeric or other resilient material which is interposed between the seat and element. In some installations the seat may be partially or wholly contained within a recess provided in one of the elements whereby, once the seat has been installed, it is concealed from view. Such an installation is generally known as a "blind installation" and one instance thereof occurs in connection with torque converters or fluid drives for automotive transmissions.

In installations of this type it has been found that occasionally after prolonged use, the elastomeric material by means of which the seal seat is ordinarily driven from its central supporting member will become hardened so that slippage will occur between the seat and member on which it is mounted, such slippage occurring by virtue of the counter torque applied to the seat by the cooperating washer with which it has a running fit. Under certain conditions, for example when the apparatus is idle for a long period of time, the washer may stick to the metallic surface of the seat and cause the seat to be rotated by the application of unwanted torque. Such a phenomenon is a frequent cause of rupture of either the seat or of the washer so that the seal is completely destroyed.

The principal object of the present invention is to provide a driving means for seal seats associated with a rotary mechanical seal which is of relatively simple construction and is inexpensive to make and which, unlike most seals currently in use, does not require that the sealing element or the part upon which it is mounted be slotted, drilled or otherwise machined to provide interlocking parts to effect the drive.

A still further object of the invention is to provide a friction coupling between a seal seat or other seal element and the part upon which it is mounted in which the coupling is provided with a servo action so that it will take effect automatically whenever there is a tendency for slippage between the parts and which servo action is such that the greater the torque imposed upon it, the greater will be the tendency for the coupling to resist the torque.

Another object of the invention is to provide a friction coupling for seal parts which is capable of permitting axial slippage between the driven member and the member on which it is mounted but which will become locked effectively in a circumferential direction, thus permitting the seal to be easily installed without the use of special arbor presses or the like.

Still another object of the invention is to provide a friction coupling of this type for seal parts which is capable of holding the part to which it is applied against relative rotation with respect to the element on which it is mounted and to which it is sealed in either direction of the applied torque.

An additional object of the invention is to provide such a coupling which normally remains inoperative during such time as the principal drive between the sealing element and the part on which it is mounted remain effective and which comes into operation only when there is a tendency for the parts to slip upon each other.

With these and other objects in view, which will become more readily apparent as the nature of the invention is better understood, the same consists in the novel construction, combination, and arrangement of parts shown in the accompanying two sheets of drawings forming a part of this specification.

In these drawings:

Fig. 3 is a sectional view similar to Fig. 1 showing a modified form of friction coupling employed in connection with the seal assembly, and Fig. 4 is a sectional view taken substantially along the line 4—4 of Fig. 3.

Figure 1:
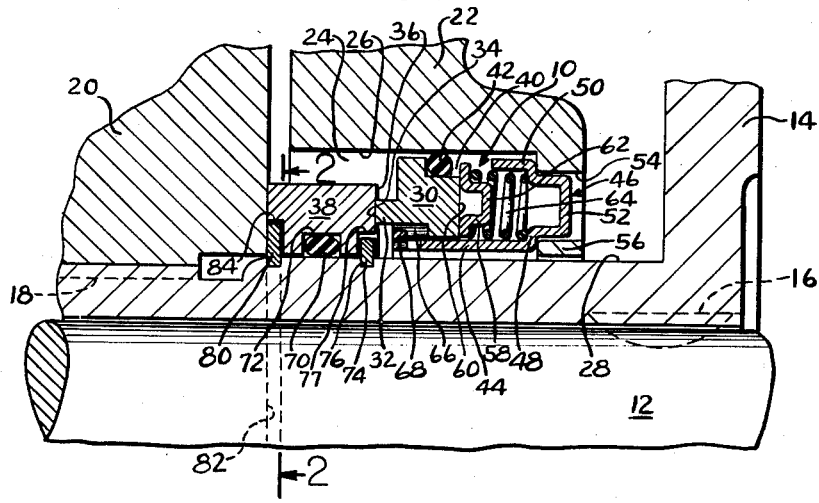
Fig. 1 is a fragmentary sectional view taken substantially centrally through a fluid drive coupling installation showing a rotary mechanical seal to which the improved friction coupling has been applied operatively disposed between a seal seat and a part upon which the seat is mounted.
Figure 2:
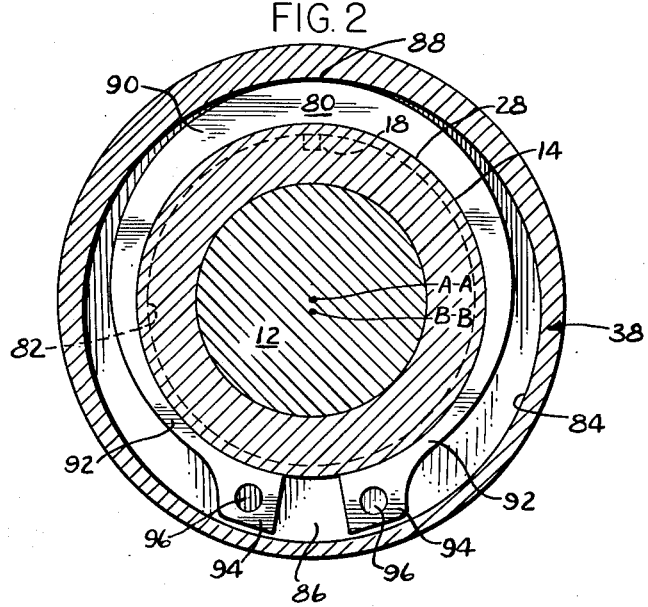
Fig. 2 is a sectional view taken substantially along the line 2—2 of Fig. 1.

Referring now to the drawings in detail and in particular to Figs. 1 and 2, the seal assembly to which the present friction coupling has been applied is designated in its entirety at 10 and it is shown as being operatively installed within a fluid drive mechanism for automotive transmissions, this illustration being purely exemplary inasmuch as the seal assembly is capable of installation in other mechanism having relatively rotatable parts. Only such portions of the fluid drive assembly as are pertinent to the use of the present seat 10 have been illustrated and among these parts are a central drive shaft 12 on which there is mounted for rotation with the shaft a sleeve 14, the drive between the shaft 12 and sleeve 14 being in the form of a key drive 16. Keyed as at 18 to the sleeve 14 for movement in unison therewith is a part 20 which may be one of the impeller vanes of the transmission and this latter part is adapted to rotate relative to a part 22 which may be the fluid coupling housing or casing. The housing 22 is formed with a recess 24 therein providing a cylindrical bore 26 which is spaced from the outer cylindrical surface 28 of the sleeve 14. The present seal assembly 10 is designed to seal the space afforded by the recess 24 so as to prevent passage of fluid through this space. In other words, the seal is designed to seal the housing 22 against the sleeve 14.

The seal 10 involves in its general organization a sealing washer 30 having a forwardly extending nose piece 32 provided with a substantially optically flat radial sealing surface 34 designed for running sealing engagement with a similarly optically flat and radial sealing surface 36 provided on a seal seat 38, the washer 30 being effectively sealed to the housing 22 and the seat being effectively sealed to the sleeve 14 in a manner that will be set forth presently.

The washer 30 is formed with a rearwardly facing external recess 40 in which there is received an endless ring 42 of resilient deformable material such as rubber, either natural or synthetic. The ring 42, which may be an ordinary O ring is preferably formed with a circular radial cross section the diameter of which is slightly larger than the radial distance between the bottom of the recess 40 and the cylindrical bore 26 so that the ring is maintained under compression and thus provides a flexible deformable seal between the washer 30 and casing 22 which will permit the washer to move axially along the sleeve 14 while still maintaining a sealing effect.

The washer 30 is slidably mounted on a central cylindrical wall 44, commonly known as a centerpost, provided on a metal retainer 46 having a radial wall 48 and a short outer cylindrical wall 50 concentric with the centerpost 44 thus rendering the retainer cup-shaped in its configuration. The radial wall 48 of the retainer is formed with a pair of rearwardly extending protuberances 52 which extend into a pair of holes 54 formed 180° apart in an inwardly extending flange 56 provided on the housing 22 at the rear end thereof. These interlocking protuberances and holes constitute a driving means whereby the retainer is constrained to rotate with the casing or housing 22. A thrust ring 58 bears against the rear face 60 of the washer and is provided with a series of circumferentially spaced protuberances 62 which constitute centering lugs for an equal number of compression springs 64 which bear at one end against the ring 58 and at the other end against the bottom wall 48 of the cup-shaped retainer 46 and serve to normally urge the ring 58, and consequently the washer 30, forwardly on the centerpost 44 to maintain the running sealing surfaces 34 and 36 in their normal sealing engagement. A plurality of longitudinally extending internal grooves 66 are formed internally of the washer 30 and extend inwardly from the forward face thereof and the forward rim of the centerpost 44 is provided with a plurality of inwardly turned lugs 68 which extend into the respective grooves 66 and serve the dual function of maintaining the washer on the centerpost against forward removal therefrom as well as establishing a drive between the washer and retainer 46.

The seat 38 is in the form of a ring-like member which surrounds the sleeve 14 and is sealed to the latter by means of an elastomeric member 70 which may be in the form of an O ring and which is disposed within an internal annular groove 72 provided in the seat, the O ring being compressed between the bottom of the groove and the cylindrical surface 28 of the sleeve 14. A split snap ring 74 seated within a groove 76 formed in the sleeve 14 limits the rearward movement of the seat 38 on the sleeve 14. A second split ring or band 80 of special design and which constitutes one of the principal elements of the present invention is seated within a groove 82 provided in the sleeve 14 and fits within a recess 84 (Fig. 2) formed in one side of the seat 38 and serves to limit the forward movement of the seat along the sleeve 14 as well as constituting an automatically operable friction coupling by means of which the seat is positively held against turning movement with respect to the sleeve 14 in the event of failure of the resilient O ring 70.

The previously mentioned recess 84 which is formed in the rear face of the seat 30 may, for convenience of machining, be of circular configuration but it is not concentric with the common axis A—A of the shaft 12, sleeve 14 and seat 38. Rather it is offset from this axis a slight distance and has a longitudinal axis B—B slightly removed from the axis A—A. In other words, the bore of the recess 84 is eccentrically disposed with respect to the axis of the washer so that the annular space existing between the outer cylindrical surface 28 of the sleeve 14 and the inner cylindrical surface of the recess 84 has a relatively wide radial span in the region designated 86 in Fig. 2 and a relatively narrow radial span in the diametrically opposed region designated 88. It is within the spirit of the invention to form the recess 84 of non-circular configuration and this may be done providing there is a contraction of the wall of the recess from a region of wide radial span gradually inwardly to regions of lesser radial span. The split ring 80 which is seated within the groove 82 provided in the sleeve 14 is housed within the recess 84 and has a relatively wide arcuate portion 90 which tapers on opposite sides of the sleeve 14 to assume relatively narrow thicknesses as designated at 92. The ends of the split ring 80 are formed with enlargements 94 thereon and these enlargements are slightly less in their radial dimension than the radial dimension previously designated at 86. The enlargements 94 may be provided with holes 96 therethrough for manipulative purposes in assembling or disassembling the ring from the annular groove 82.

Referring now to Fig. 2, it will be observed that the inner arcuate surface of the band 80 need not necessarily grip the sleeve 14 at the bottom of the groove 82 and on the contrary it may have a fairly loose fit, it being deemed unimportant whether the fit be snug or otherwise. In any event, the disposition of the two enlarged ends 94 of the band 80 within the enlarged portion 86 of the annulus is such that should slippage occur between the seat 38 and sleeve 14 in either direction, one or the other end of the band will be engaged by the inner cylindrical but eccentrically offset surface of the recess 84 and the vectorial direction of thrust exerted upon the enlarged end of the band will be such as to tend to close the split band and cause the medial regions thereof to tightly grip the sleeve 14. It is to be further noted that the vectorial direction of force applied to the enlargement will have a circumferential component of direction tending to close the band but moreover it will have a large positive inwardly directed radial component whereby, as the eccentricity or radial displacement of the increments on the inner surface of the bore 84 which engage the enlargement grows less, a strong binding action will take place with the enlargement 94 serving as a wedge member between the outer surface of the sleeve 14 and the inner surface of the bore 84 so that the parts will become positively locked and only a very small amount of initial slippage between them will be permitted. After the parts have become thus locked in a fixed relation, the sleeve 14, split band 80 and seat 38 will rotate in unison. This tendency for the split band 80 to bind on the sleeve 14 and for one or the other of the enlargements 94 to become wedged between the sleeve and seat will obtain regardless of the direction of slippage. The band will thus be effective to prevent relative rotation between the seat 38 and sleeve 14 in either direction and a servo-action will result due to the aforementioned relationship between the parts. The band 80 however may readily be removed from the sleeve 14 by simply spreading the ends thereof apart so that the band will clear the groove 82 to permit it to be slid longitudinally from the sleeve.

Referring now to Figs. 3 and 4 wherein a modified form of friction coupling means between a seal seat and a part upon which it is mounted and to which it is sealed has been disclosed, a slightly different form of seal assembly 110 has been disclosed. To avoid needless repetition of description, similar reference characters have been applied to the corresponding parts in Fig. 3 insofar as is practicable to designate those elements which have their counterpart in Figs. 1 and 2. In this latter form of the invention the seal assembly may be pressed within a recess 126 provided in the casing 122 associated with a pump or other similar construction. The seal assembly 110 surrounds an enlarged portion 113 formed on a central shaft 112 having mounted thereon a part 120 which rotates with the shaft. The seal retainer 164 has an outer cylindrical wall 150, an inner cylindrical wall or centerpost 144 and an interconnecting radial wall 145. A plurality of ribs 168 provided on the centerpost extend into longitudinal grooves 166 formed interiorly of the washer 130 so that a positive drive exists between the retainer and washer.

The forward face 134 on the washer 130 is designed for running sealing engagement with the rear face 136 provided on the seat member 138 and the latter surrounds the shaft 112 and is sealed with respect thereto by means of an O ring 170 contained within a groove 172 provided interiorly of the seat. In order to prevent relative turning movement between the shaft and seat 138 under the conditions outlined in connection with the form of the invention shown in Fig. 1, the rear side of the seat is recessed as at 183, the recess being provided in the periphery of the seat and affording a surface 184 which may be cylindrical and which faces outwardly and which is eccentrically disposed with respect to the central axis A'—A' of the seat as evidenced by the axis B'—B' in Fig. 4. Insofar as the surface 184 is concerned, the point of least eccentricity is designated at 186, this point occurring when the seal parts assume the positions shown in the drawings vertically upon the longitudinal axis of the shaft 112. The point of greatest eccentricity is of course the point 188 which is diametrically opposed to the point 186 below the longitudinal axis of the shaft. Pressed within a socket 185 provided in the part 120 is a drive pin 187 and the free end of which overlies the region of least eccentricity on the cylindrical surface 184 in close proximity thereto. It is within the scope of the invention to make the surface 184 of non-circular configuration, the important thing being to provide a region of relatively small eccentricity which gradually merges with regions of greater eccentricity for proper camming action of the surface 184 with the drive pin 187 as will be described presently.

In the operation of the form of the invention shown in Figs. 3 and 4 it will be seen that in the absence of any slippage between the seat 138 and the shaft 112 the various parts will retain the relative positions shown in Fig. 3. However, in the event of slippage between the seat 138 and shaft 112 in either direction, the more eccentric regions of the cylindrical surface 184 provided on the seat 138 will move into engagement with the inner side of the protruding end of the pin 187 and become firmly clamped or locked thereagainst so that further turning movement of the seat 138 relative to the shaft 112 will be prevented.

The invention is not to be limited to the exact arrangement of parts shown in the accompanying drawings or described in this specification since various changes in the details of construction of the invention may be resorted to without departing from the spirit of the invention. Only insofar as the invention has been particularly pointed out in the accompanying claims is the same to be limited.

What I claim is:

1. In a fluid seal for relatively rotatable elements one of which is in the form of a casing and the other of which is in the form of a shaft passing through said casing, in combination, a sealing member surrounding the shaft and effectively sealed thereto, and means for preventing relative rotation between the sealing member and shaft, said last mentioned means comprising an external cylindrical surface on the sealing member eccentrically disposed with respect to the axis of the latter, and a projection carried by said shaft and positioned in close proximity to that portion of the cylindrical surface which is least removed from the axis of the sealing member, said projection being designed for camming engagement with portions of the cylindrical surface which are more remote from said latter axis when limited relative turning movement between said sealing member and shaft takes place.

2. In a fluid seal for relatively rotatable elements one of which is in the form of a casing and the other of which is in the form of a shaft passing through said casing, in combination, a sealing member surrounding the shaft and effectively sealed thereto, and means for preventing relative rotation between the sealing member and shaft, said last mentioned means comprising an external surface on the sealing member having regions of differing eccentricity with respect to the axis of the sealing member, and a projection carried by said shaft and positioned in close proximity to that portion of the cylindrical surface which is least removed from the axis of the sealing member, said projection being designed for camming engagement with portions of the cylindrical surface which are more remote from said latter axis when limited relative turning movement between said sealing member and shaft takes place.

References Cited in the file of this patent

UNITED STATES PATENTS

| | | |
|---|---|---|
| 2,037,144 | Olson | Apr. 14, 1936 |
| 2,038,121 | Miller | Apr. 21, 1936 |
| 2,118,885 | Hughes | May 31, 1938 |
| 2,273,379 | Searles | Feb. 14, 1942 |
| 2,444,714 | Voytech | July 6, 1948 |